(12) United States Patent
Majumdar et al.

(10) Patent No.: US 9,282,579 B2
(45) Date of Patent: Mar. 8, 2016

(54) DEACTIVATING ELEVATED PRIORITY PUBLIC DATA NETWORK CONNECTIONS IN USER EQUIPMENT

(71) Applicant: Broadcom Corporation, Irvine, CA (US)

(72) Inventors: Soma Majumdar, Bangalore (IN); Lakshmi Siva Koteswararao Chimakurthi, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 101 days.

(21) Appl. No.: 13/906,054

(22) Filed: May 30, 2013

(65) Prior Publication Data
US 2014/0349602 A1 Nov. 27, 2014

Related U.S. Application Data

(60) Provisional application No. 61/826,776, filed on May 23, 2013.

(51) Int. Cl.
*H04W 4/22* (2009.01)
*H04W 76/00* (2009.01)

(52) U.S. Cl.
CPC .............. *H04W 76/007* (2013.01); *H04W 4/22* (2013.01)

(58) Field of Classification Search
CPC ........................ H04W 76/025; H04W 76/064
See application file for complete search history.

(56) References Cited

U.S. PATENT DOCUMENTS

| | | | | |
|---|---|---|---|---|
| 8,594,614 B2* | 11/2013 | Eitel | ............. | H04M 11/04 455/404.1 |
| 2005/0281222 A1* | 12/2005 | Ranta-Aho | ......... | H04W 76/046 370/328 |
| 2012/0082029 A1* | 4/2012 | Liao | .............. | H04W 76/025 370/230 |
| 2012/0182912 A1* | 7/2012 | Watfa | ............... | H04W 36/0022 370/311 |
| 2012/0208486 A1* | 8/2012 | Liao | .............. | H04W 28/02 455/404.1 |
| 2013/0258998 A1* | 10/2013 | Ramachandran | ... | H04W 76/027 370/331 |
| 2013/0281048 A1* | 10/2013 | Hietalahti | ............... | H04W 4/22 455/404.1 |
| 2014/0241264 A1* | 8/2014 | Liu | .............. | H04W 76/062 370/329 |

FOREIGN PATENT DOCUMENTS

WO   WO 2013/017032   *   7/2013   .......... H04W 76/062

OTHER PUBLICATIONS

LTE and Beyond (http://www.lteandbeyond.com/2013/03/periodic-tracking-area-update-tau.html—Mar. 11, 2013).*

* cited by examiner

*Primary Examiner* — Jinsong Hu
*Assistant Examiner* — Tabla Glomah
(74) *Attorney, Agent, or Firm* — Brinks Gilson & Lione

(57) ABSTRACT

A user equipment establishes an elevated priority data connection and one or more non-elevated priority data connections. The elevated priority data connection may be an emergency public data network (PDN) connection. The user equipment may determine that one or more deactivation criteria for the emergency PDN connection is satisfied while the emergency PDN connection and at least one non-emergency PDN connection of the user equipment are active. Deactivation criteria may include expiration of a Periodic Tracking Area Update timer. In response, the user equipment may locally deactivate the emergency PDN connection and send a deactivation indication to the operator network.

17 Claims, 4 Drawing Sheets

DEACTIVATING ELEVATED PRIORITY PUBLIC DATA NETWORK CONNECTIONS IN USER EQUIPMENT

TECHNICAL FIELD

This application claims priority to provisional application No. 61/826,776, filed May 23, 2013, titled "Deactivating Elevated Priority Public Data Network Connections In User Equipment," which is incorporated by reference herein in its entirety.

TECHNICAL FIELD

This disclosure relates to user equipment. This disclosure also relates to deactivating an elevated priority public data network connection of a user equipment.

BACKGROUND

Rapid advances in electronics and communication technologies, driven by immense customer demand, have resulted in the widespread adoption of mobile communication devices. The extent of the proliferation of such devices is readily apparent in view of some estimates that put the number of wireless subscriber connections in use around the world at nearly 80% of the world's population. Furthermore, other estimates indicate that (as just three examples) the United States, Italy, and the UK have more mobile phones in use in each country than there are people living in those countries. Consumers continue to demand and purchase mobile communication devices with increased or additional capabilities. Consequently, mobile communication device and component manufacturers are continually developing additional communication features for mobile communication devices, such as cellular phones.

DETAILED DESCRIPTION

The discussion below makes reference to user equipment (UE). User equipment may take many different forms and have many different functions. As one example, user equipment may be a cellular or mobile phone capable of making and receiving wireless phone calls. The user equipment may also be a smartphone that, in addition to making and receiving phone calls, runs general purpose applications. User equipment may be virtually any device that wirelessly connects to a network, including as additional examples a driver assistance module in a vehicle, an emergency transponder, a pager, a satellite television receiver, a networked stereo receiver, a computer system, music player, or virtually any other device.

Figure 1:
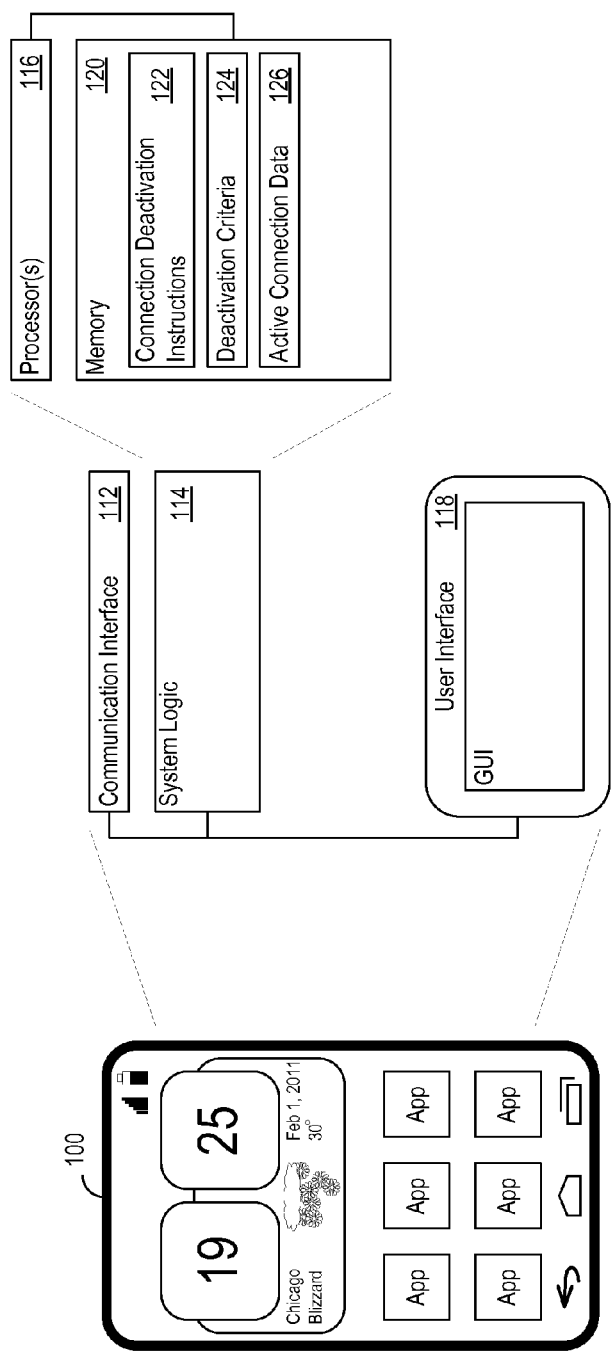
FIG. 1 shows an example of a user equipment.

FIG. 1 shows an example of a user equipment 100. The user equipment 100 includes a communication interface 112, system logic 114, and a user interface 118. The system logic 114 may include any combination of hardware, software, firmware, or other logic. The system logic 114 may be implemented, for example, in a system on a chip (SoC), application specific integrated circuit (ASIC), or other circuitry. The system logic 114 is part of the implementation of any desired functionality in the user equipment. In that regard, the system logic 114 may include logic that facilitates, as examples, running applications, accepting user inputs, saving and retrieving application data, establishing, maintaining, and terminating cellular phone calls, public data network (PDN) connections, wireless network connections, Bluetooth connections, or other connections, and displaying relevant information on the user interface 118. The user interface 118 may include a graphical user interface, touch sensitive display, voice or facial recognition inputs, buttons, switches, and other user interface elements.

The communication interface 112 may include one or more transceivers. The transceivers may be wireless transceivers that include modulation/demodulation circuitry, amplifiers, analog to digital and digital to analog converters and/or other logic for transmitting and receiving through one or more antennas, or through a physical (e.g., wireline) medium. As one implementation example, the communication interface 112 and system logic 114 may include a BCM2091 EDGE/HSPA Multi-Mode, Multi-Band Cellular Transceiver and a BCM59056 advanced power management unit (PMU), controlled by a BCM28150 HSPA+system-on-a-chip (SoC) baseband smartphone processor. These integrated circuits, as well as other hardware and software implementation options for the user equipment 100, are available from Broadcom Corporation of Irvine Calif. The transmitted and received signals may adhere to any of a diverse array of formats, protocols, modulations, frequency channels, bit rates, and encodings that presently or in the future support communications. As one specific example, the communication interface 112 and the system logic 114 may support transmission and reception under the Universal Mobile Telecommunications System (UMTS), 3rd Generation Partnership Project (3GPP), GSM (R) Association, Long Term Evolution (LTE)™ efforts, or other communication technologies, partnerships or standards bodies.

In one implementation, the system logic 114 includes one or more processors 116 and a memory 120. The memory 120 stores, for example, connection deactivation instructions 122 that the processor 116 executes, deactivation criteria 124, and active connection data 126. The deactivation criteria 124 may specify conditions for when the system logic 114 deactivates a data connection, such as an elevated priority data connection. The active connection data 126 may store identifiers, parameters, indications, or other information associated with active connections maintained by the system logic 114, including public data network (PDN) connections. Data connections, including PDN connections, may include connections for communicating across packet-switched networks, such as Internet Protocol (IP) based networks, the Internet, or other public data networks. As will be described in more detail below, the system logic 114 may determine that one or more of the deactivation criteria 124 are satisfied, and in response, deactivate an elevated priority data connection of the user equipment 100.

Figure 2:
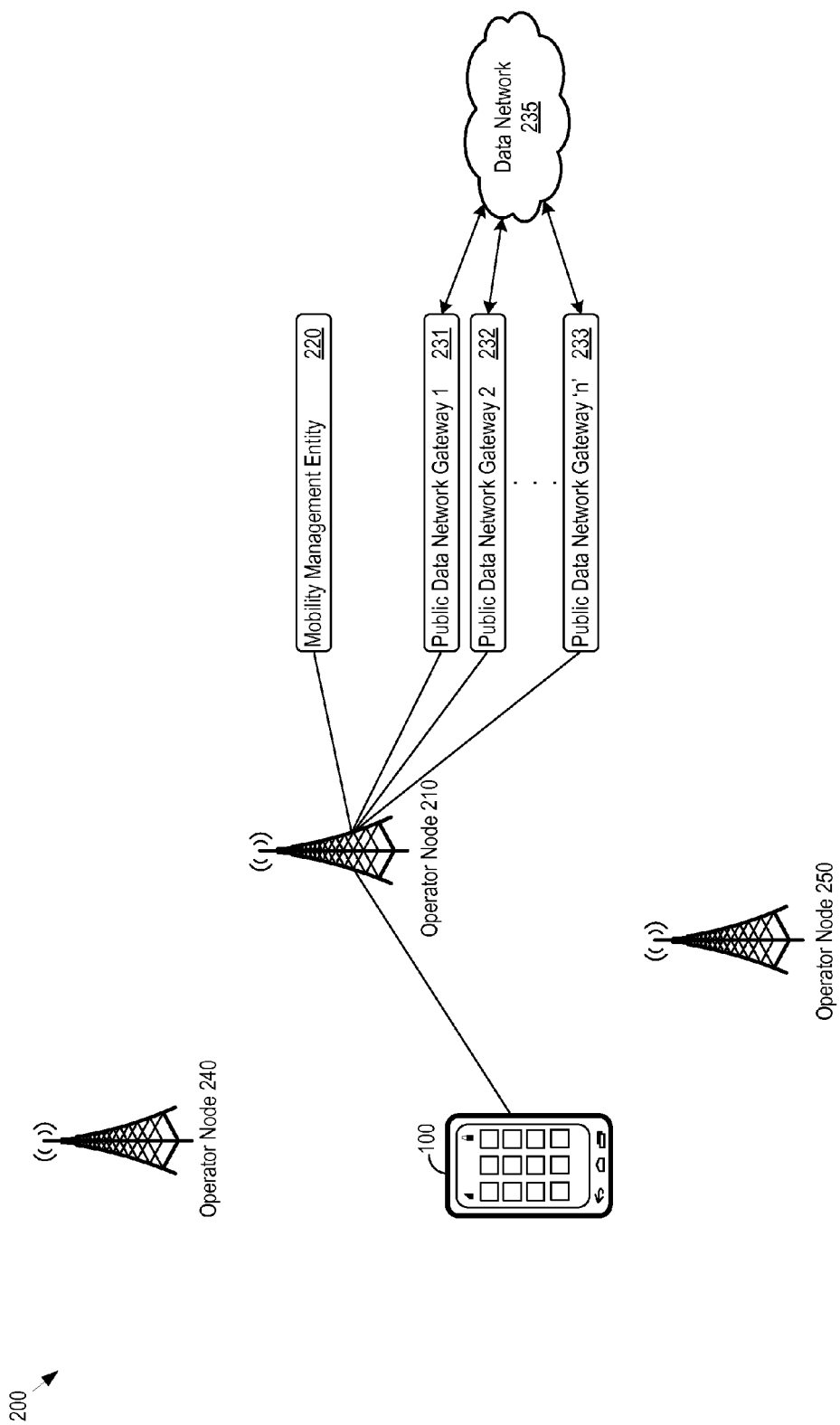
FIG. 2 shows an example of a system for deactivating an elevated priority PDN connection when the user equipment is also connected to a non-elevated priority PDN connection.

FIG. 2 shows an example of a system 200 for deactivating an elevated priority PDN connection when the user equipment 100 is also connected to a non-elevated priority PDN connection. The user equipment 100 may communicate across any number of communication networks, including an operator network shown in FIG. 2. The operator network may include multiple operator nodes, including the operator nodes labeled as 210, 240, and 250. The operator nodes 210, 240, and 250 may include any hardware, software, or logic to support communication (e.g., direct communication) with the user equipment 100. As examples, the operator nodes 210, 240, 250 may be implemented as a base transceiver station, as a Node B according to UTMS, as an eNodeB according to 3GPP LTE, etc.

The operator network may include any number of communication components to manage communications across the operator network. In the exemplary system 200 shown in FIG. 2, the operator network includes a mobility management entity (MME) 220. The MME 220 may establish or manage connections for any number of user equipment connected to the operator network. The operator network shown in FIG. 2 also includes multiple PDN gateways, such as those labeled as Public Data Network Gateway 1 231, Public Data Network 2 232, and Public Data Network Gateway 'n' 233. The PDN gateways 231, 232, and 233 may provide an interface with one or more external packet data networks, such as the data network 235 or the Internet, through which the user equipment 100 communicates packet data.

The system logic 114 of the user equipment 100 may establish and manage any number of data connections of the user equipment 100, including PDN connections, packet switching (PS) connections, and more. For example, the system logic 114 may include Non-Access Stratum (NAS) layer logic responsible for mobility management and data connections of the user equipment 114. The system logic 114 may also specify, characterize, or identify a priority associated with the data connections. Data connection priorities may include any priority or priority scheme specified by a particular communication standard or protocol, the system logic 114, an operator or communication network that the user equipment 100 is connected to, user input received through the user interface 118, or any combination thereof.

As one particular example, the system logic 114 may identify emergency connections as elevated priority connections. Emergency connections may include any data connection established for emergency bearer services, established with a connection request type set to "emergency," or established including any other emergency indication. The system logic 114 may establish an emergency PDN connection to perform an emergency call, such as any call directed to a recognized emergency number, emergency agency, authority, or service, e.g., police, medical, fire, or other emergency services. Emergency numbers may include "911" in the United States, "112" in Europe, and other emergency numbers as specified by a particular nation or group of nations. The system logic 114 may support performing voice calls over an emergency PDN connection, e.g., through any Voice over Internet Protocol (VoIP) communication methods or as an IP Multimedia System (IMS) emergency call. Components of an operator network, e.g., the operator nodes 210, MME 220, PDN gateways 231-233, etc., may likewise identify elevated priority data connections and handle data communicated through emergency data connections with increased priority.

The user equipment 100 may establish multiple PDN connections, including PDN connections of varying priority. In that regard, the user equipment 100 may be connected to an emergency PDN connection as well as one or more non-emergency PDN connections. For example, in FIG. 2, the user equipment 100 may establish a non-elevated priority PDN connection through PDN gateways 1 231 and an elevated priority PDN connection through PDN gateway 1 231. Maintaining multiple PDN connections including an emergency PDN connection can impact the operator network. By deactivating the emergency PDN connection in a timely manner, e.g., according to the methods, systems, and examples disclosed herein, the system logic 114 may prevent congestion or complications in the operator network at the operator nodes 210, 240, and 250, in the MME 220, or at other network components.

To illustrate, when a UE has established an emergency PDN connection or other high priority PDN connection, the UE may treat non-emergency communications as emergency communications. Access stratum logic of the UE may designate subsequent or additional non-emergency connections as emergency connections, for example by specifying a radio resource control (RRC) establishment cause as "emergency." Subsequent mobility related communications or control signaling for non-elevated priority PDN connections or non-emergency communications may be handled as an emergency or as elevated priority communication by the UE with multiple PDN connections or by various components of the operator network, such as an eNodeB or the MME 220. The UE or operator network components may also bypass certain access limiting conditions enforced by the UE or the operator network for non-emergency connections, thus increasing traffic through the operator network. Accordingly, congestion or complications in the operator network may arise when UEs continually maintain an emergency PDN connection, e.g., after an emergency situation has passed. In some cases, a UE may maintain the emergency PDN connection when other non-emergency PDN connections are active until the UE detaches from the operator network, and these congestion issues may be particularly prevalent when the UE concurrently maintains the emergency PDN connection and one or more non-emergency PDN connections. The system logic 114 may address any of the above-described concerns by deactivating an elevated priority data connection according to one or more deactivation criteria.

Figure 3:
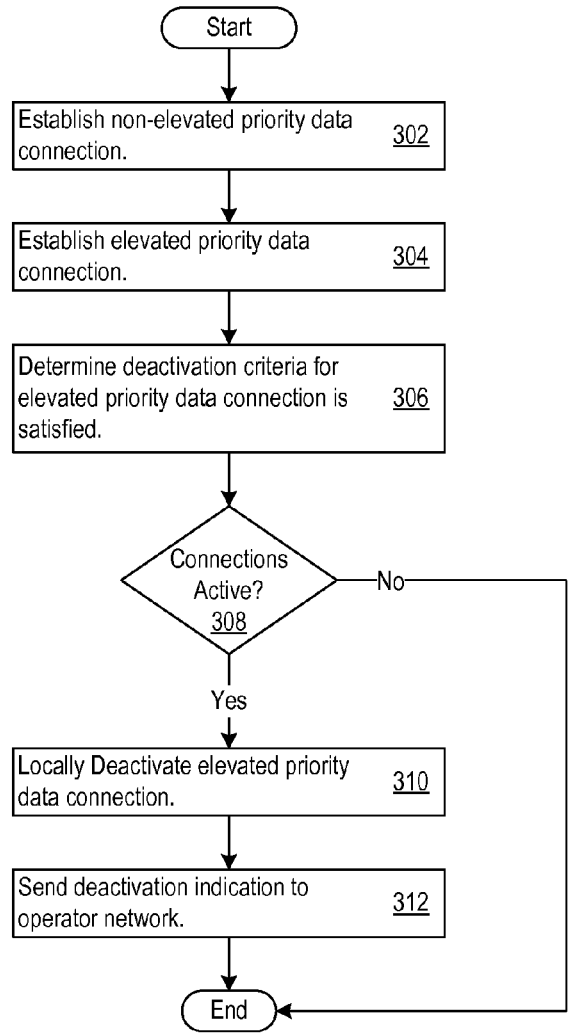
FIG. 3 shows an example of logic that the user equipment may implement in hardware, software, or firmware.

FIG. 3 shows an example of logic 300 that the user equipment 100 may implement in hardware, software, or firmware. For example, the system logic 114 may implement the logic 300 in software as the connection deactivation instructions 122.

The system logic 114 may also establish one or more non-elevated priority data connections (302). The system logic 114 may initiate a connection or access request specifying a non-elevated priority request according a particular communication protocol, standard, or according to any other connection priority scheme implemented by the user equipment 100 or the operator network. As one example, the system logic 114 may identify the connection request as an "originating signaling" type according to the 3GPP standard, and may set the RRC establishment cause to MO signaling.

The system logic 114 may establish an elevated priority data connection (304). As described above, the elevated priority data connection may be an emergency PDN connection for performing emergency bearer services, such as performing an emergency IMS or VoIP call over the emergency PDN connection. To establish the elevated priority data connection, the system logic 114 may, for example, initiate a connection or access request with the operator network, specifying an elevated priority request, e.g., emergency connection type. At the radio level, access stratum logic of the system logic 114 may set an RRC establishment field to indicate an elevated priority request, e.g., by setting the RRC establishment cause field as emergency.

In some implementations, the system logic 114 may establish non-elevated priority data connections before establishing an elevated priority data connection. For example, the system logic 114 may establish data connections in accordance with the 3GPP standard, which does not permit establishing non-emergency data PDN connections after establishing an emergency PDN connection. In other implementations, the system logic 114 may establish non-elevated priority data connections before, during, or after establishing an elevated priority data connection.

The system logic 114 obtains deactivation criteria 124 for deactivating the elevated priority data connection and determines when the deactivation criteria 124 is satisfied (306). In some implementations, the system logic 114 accesses the deactivation criteria 124 from the memory 120. The deactivation criteria 124 may be pre-configured or pre-stored in the user equipment 100, e.g., during manufacture or prior to use by a user of the user equipment 100. Additionally or alternatively, the deactivation criteria 124 may be user-specified. For example, a user may configure one or more deactivation criteria 124 through a user interface 118. In other examples, the system logic 114 may prevent a user-requested change to the deactivation criteria 124. As yet another example, the system logic 114 may receive the deactivation criteria 124, or parameters associated with the deactivation criteria 124, from an external source, such as a manufacturer of the user equipment 100, from the particular network the user equipment 100 is connected to, or from other sources.

The deactivation criteria 124 may take any number of forms, some of which are presented next. The deactivation criteria 124 relate to a timing value received from the operator network. In that regard, the system logic 114 may obtain a periodic timing value from the operator network, configure a timer according to the obtained periodic timing value, and determine that the timer configured or maintained according to the periodic timing value has expired. As one example with respect to 3GPP LTE, the system logic 114 may receive a Periodic Tracking Area Update timer value (T3412 timer) from an operator network, e.g., through an ATTACH ACCEPT communication or TRACKING AREA UPDATE communication received from the operator network. In this example, the system logic 114 determines the deactivation criteria 124 is satisfied when a periodic tracking area update timer maintained by the system logic 114 expires. The system logic 114 may similarly utilize any number of other timing or response parameters provided by a network operator or otherwise obtained, such as periodic location update timers, idle timers, registration timers, and the like. As additional exemplary timers, the system logic 114 may utilize a periodic Routing Area Update timer value or a periodic Location Area Update timer value received from a Universal Terrestrial Radio Access Network (UTRAN) or an internally configured timer value.

As another example, the deactivation criteria 124 may be satisfied when a threshold time has elapsed since the elevated priority data connection was established. The system logic 114 may configure a timer to start upon establishing the elevated priority data connection, and to run for an amount of time equal to the threshold time. The threshold time may be a user-configurable value, or the system logic 114 may specify the threshold time. In some implementations, the system logic 114 may enforce a minimum value for the threshold time, e.g., 15 minutes, and reject any user attempts to configure the threshold time below the minimum value. Upon expiry of the internal timer, the system logic 114 may determine that the deactivation criteria 124 is satisfied.

Continuing discussion of exemplary deactivation criteria 124, the deactivation criteria 124 may be satisfied when the elevated priority data connection has been inactive for longer than an inactivity time threshold. In this example, the system logic 114 may maintain an internal timer for a duration of the inactivity time threshold. The inactivity threshold time may be a user-configurable value, or the system logic 114 may specify the inactivity threshold time. The system logic 114 may start the internal timer configured according to the inactivity threshold time upon detecting inactivity of the elevated priority data connection, e.g., when the system logic 114 stops transferring data across the elevated priority data connection. When the system logic 114 identifies activity on the elevated priority data connection, the system logic 114 may reset the internal timer and start the internal timer again upon detecting inactivity. When the internal timer configured according to the inactivity time threshold expires, the system logic 114 may determine that the deactivation criteria 124 is satisfied. In a similar manner, the deactivation criteria 124 may be satisfied when a threshold time has elapsed since a voice call was performed over the elevated priority data connection, and an internal timer may be configured and maintained accordingly.

As another example, the deactivation criteria 124 may be satisfied when the system logic 114 determines a user deactivation request has been received. The user equipment 100 may receive the user deactivation request through the user interface 118, for example when a user of the user equipment 100 explicitly requests deactivation of the elevated priority data connection.

While some examples of deactivation criteria 124 were presented above, the system logic 114 may obtain or use any number of additional alternative deactivation criteria 124. Moreover, the system logic 114 may use any combination of the deactivation criteria 124, for example by weighting some or all of the deactivation criteria 124 and determining whether the deactivation criteria 124 is satisfied based on the specified weights.

Continuing discussion of the logic 300, the system logic 114 may determine whether the elevated and non-elevated priority data connections are active when the deactivation criterion is satisfied (308). The system logic 114 may take no action regarding deactivating the elevated priority data connection when the elevated priority data connection was previously deactivated, e.g., in response to receiving a deactivation from a PDN gateway or other component of the operator network.

When the elevated priority data connection and at least one non-elevated priority data connection of the user equipment 100 are active upon determining satisfaction of the deactivation criteria 124, the system logic 114 may deactivate the elevated priority data connection. The system logic 114 may deactivate the elevated priority data connection, but continue to maintain the non-elevated priority connection. Accordingly, the system logic 114 may deactivate the elevated priority data connection without detaching the user equipment 100 from the operator network. In some implementations, the system logic 114 locally deactivates the elevated priority connection in the user equipment 100 (310). Local deactivation may include the system logic 114 ceasing communication across the elevated priority data connection and removing one or more indications of the elevated priority data connection from the user equipment 100. For example, the system logic 114 may delete a data entry associated with the elevated priority data connection from any connection data structures maintained by the user equipment 100. Such connection data structures may include connection identifier databases, Quality of Service (QoS) databases, and more.

The system logic 114 may also send a deactivation indication to the operator network (312). The deactivation indication may indicate to the operator network, either explicitly or implicitly, that the elevated priority data connection has been deactivated on the user equipment 100. The deactivation indication may indicate an updated status of PDN connections maintained by the user equipment1 100, which may indicate that the non-elevated priority data connection is active. As one example, the system logic 114 may initiate a Periodic Tracking Area Update procedure, and specify in an EPS bearer context status field of a Tracking Area Update Request Message that the elevated priority data connection is inactive, e.g., by foregoing including elevated priority data connection in the EPS bearer context status field. In some implementations, the system logic 114 sends a separate or dedicated communication explicitly specifying that the elevated priority data connection has been deactivated on the user equipment 100 or requesting that the operator network deactivate the elevated priority PDN connection on the operator network side, e.g., via the MME 220 or PDN gateways.

Due to the system logic 114 deactivating the elevated priority data connection, the system logic 114 may send subsequent communications through a non-elevated priority data connection. Thus, when sending the deactivation indication to the operator network, the system logic 114 may specify a RRC establishment cause as non-elevated priority, e.g., as originating signaling.

By sending the deactivation indication to the operator network, the system logic 114 may inform the operator network of the deactivation of the elevated priority data connection. In response, the operator network may also deactivate the elevated priority data connection on the network side, e.g., by removing indications of the elevated priority data connection from one or more connection data structures maintained by the operator network.

While the example logic 300 in FIG. 3 was discussed in terms of an elevated priority data connection and non-elevated priority data connection, the system logic 114 may likewise establish connections of a first and second priority, which may not necessarily differ as elevated and non-elevated priorities. The system logic 114 may determine when to deactivate a connection of a first priority in a consistent manner as described herein.

Figure 4:
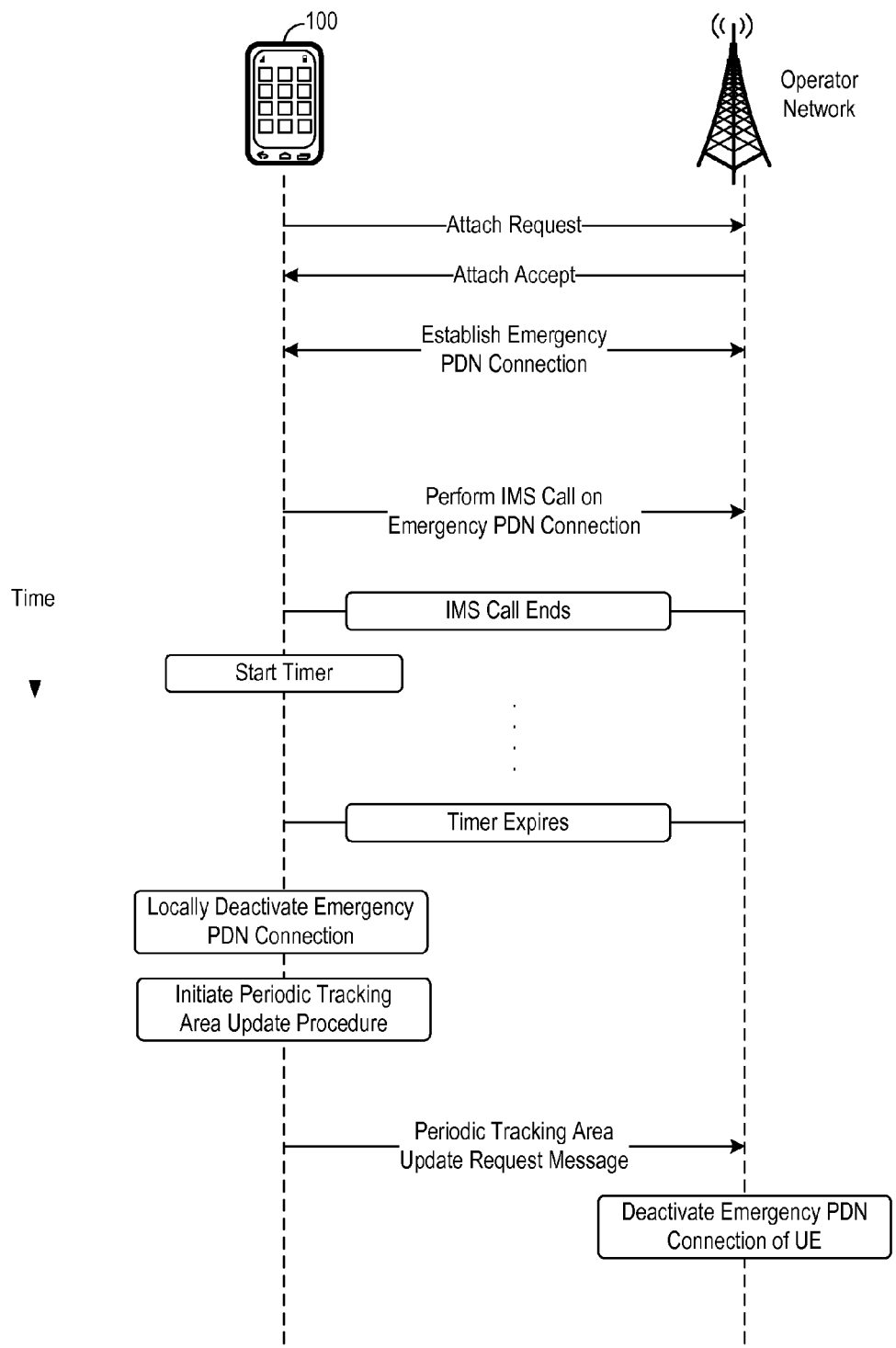
FIG. 4 shows a timing example for deactivating an elevated priority PDN connection when the user equipment is also connected to a non-elevated priority PDN connection.

FIG. 4 shows a timing example 400 for deactivating an elevated priority PDN connection when the user equipment 100 is also connected to a non-elevated priority PDN connection. The timing example 400 presents one example of interaction between the user equipment 100 and an operator network according to a 3GPP LTE standard. The system logic 114 may support consistent communications for other communication standards as well.

In FIG. 4, the user equipment 100 sends an ATTACH REQUEST communication to the operator network, such as when the user equipment 100 initially connects to the operator network or to a particular eNodeB of the operator network. The operator network may respond with an ATTACH ACCEPT communication, indicating the operator network's acceptance of the ATTACH REQUEST. As part of the ATTACH REQUEST communication, the operator network may also provide a Periodic Tracking Area Update timer value, e.g., the T3412 timer value. In some implementations, the operator network may provide a particular Periodic Tracking Area Update timer value specific to emergency PDN connections, which may be shorter in duration than corresponding Periodic Tracking Area Update timer values for non-emergency PDN connections. In other implementations, the operator network provides a Periodic Tracking Area Update Timer applicable to both emergency and non-emergency PDN connections.

The user equipment 100 may initiate an emergency PDN establishment procedure to establish an emergency PDN connection with the operator network, which may include specifying a request type as emergency in the non-access stratum layer and indicating an emergency RRC establishment cause connection in the access stratum layer. After establishing the emergency PDN connection, the user equipment 100 may perform an IMS emergency call through the emergency PDN connection. The IMS emergency call may be directed to a particular emergency agency or for a particular emergency phone number, such as '911' in the United States. Thus, the user equipment 100 may actively communicate data across the emergency PDN connection during the IMS call.

The user equipment 100 may cease sending data across the emergency PDN connection after the IMS call concludes. Upon identifying the UE has entered an ECM-IDLE mode, the system logic 114 may start the Periodic Tracking Area Update (T3412) timer configured according to the emergency connection T3412 timer value provided by operator network. The system logic 114 may determine expiry of the T3412 timer, such as when the user equipment 100 is in the ECM-IDLE mode for the duration of the T3412 timer. At that time, the system logic 114 may determine whether the emergency PDN connection is still active and whether at least one non-emergency PDN connection is active. If so, the user system logic 114 locally deactivates the emergency PDN connection on the user equipment 100 without deactivating a non-emergency PDN connection. That is, the system logic 114 deactivates the emergency PDN connection without detaching the user equipment 100 from the operator network.

The system logic 114 the initiates a Periodic Tracking Area Update procedure, e.g., in any of the ways described above. As part of the Periodic Tracking Area Update procedure, the system logic 114 sends a Periodic Tracking Area Update Request Message to the operator network. The Periodic Tracking Area Update Request Message indicates that the emergency PDN connection is not active on the user equipment 100, but that the non-emergency PDN connection is active. The system logic 114 may provide such indications utilizing the EPS bearer context status field of the Request Message. Accordingly, the user equipment 100 provides a deactivation indication to the operator network, allowing the operator network to synchronize deactivation of the emergency PDN connection of the user equipment 100 on the network side.

According to the example shown in FIG. 4 and other embodiments presented in this disclosure, the user equipment 100 may deactivate an emergency or elevated priority PDN connection while maintaining one or more non-emergency or non-elevated priority PDN connections. The system logic 114 may do so without impacting existing user equipment 100 signaling with the operator network, e.g., between the user equipment 100 and the MME 220. Moreover, the system logic 114 may perform one or more of the deactivation processes described above in accordance with a communication standard, such as the 3GPP standard. As another benefit, by sending a deactivation indication to the operator network, the system logic 114 may allow the operator network, including the MME 200, to synchronize with the user equipment 100 for the deactivation of an elevated priority PDN connection.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the user equipment or operator network may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

Various implementations have been specifically described. However, many other implementations are also possible.

What is claimed is:

1. A method comprising:
in a user equipment:
establishing a non-elevated priority cellular data connection;
establishing an elevated priority cellular data connection;
identifying a deactivation criterion for deactivating the elevated priority cellular data connection;
obtaining a periodic timing value from the operator network;
determining that the deactivation criterion is satisfied, the deactivation criterion comprising expiration of a timer maintained according to the periodic timing value; and
when the elevated and non-elevated priority data connections are active upon determining the deactivation criterion is satisfied:
locally deactivating, by user equipment, the elevated priority data connection including removing an indication of the elevated priority data connection from the user equipment.

2. The method of claim 1, where locally deactivating the elevated priority data connection in the user equipment comprises: removing a data entry associated with the elevated priority data connection from a connection data structure maintained by the user equipment.

3. The method of claim 1, further comprising:
sending a deactivation indication for the elevated priority data connection to an operator network after deactivating the elevated priority data connection.

4. The method of claim 3, where sending the deactivation indication comprises: initiating a registration procedure with the operator network indicating that the elevated priority data connection has been locally deactivated.

5. The method of claim 1, where determining that the deactivation criterion is satisfied comprises: determining that a threshold time has elapsed since establishing of the elevated priority data connection.

6. The method of claim 1, where determining that the deactivation criterion is satisfied comprises: determining that a threshold time has elapsed since a voice call was performed over the elevated priority data connection.

7. The method of claim 1, where determining that the deactivation criterion is satisfied comprises: determining that the elevated priority data connection has been inactive for longer than an inactivity time threshold.

8. The method of claim 1, where the elevated priority data connection comprises an emergency data connection.

9. A device comprising:
a memory storing a deactivation criterion the deactivation criterion comprising pre-specified operational conditions for deactivation of a data connection; and
system logic circuitry in communication with the memory, the system logic circuitry configured to:
read the deactivation criterion from the memory;
establish a non-elevated priority cellular data connection with an operator network;
establish an elevated priority cellular data connection with the operator network;
obtain a periodic timing value from the operator network;
determine that the deactivation criterion is satisfied while the elevated and non-elevated priority data connections are active, the deactivation criterion comprising expiration of a timer maintained according to the periodic timing value, and in response:
locally deactivate the elevate priority data connection while maintaining the non-elevated priority cellular data connection, wherein the deactivation comprises removal of an indication of the elevated priority data connection from the memory of the device.

10. The device of claim 9, where the system logic circuitry is configured to deactivate the elevate priority data connection while maintaining the non-elevated priority data connection by:
communicating to the operator network that the elevated priority data connection has been deactivated and that the non-elevated priority data connection has not been deactivated.

11. The device of claim 9, where the deactivation criterion is satisfied when a threshold time has elapsed since the elevated priority data connection was established.

12. The device of claim 9, where the deactivation criterion is satisfied when the elevated priority data connection has been inactive for longer than an inactivity time threshold.

13. A device comprising:
a communication interface for cellular communications; and
system logic circuitry in communication with the communication interface, the system logic circuitry configured to:
obtain a periodic timer value from an operator network through the communication interface;
establish an emergency public data network (PDN) connection with the operator network through the communication interface;
maintain a timer based on the periodic timer value obtained from the operator network;
determine that the emergency PDN connection and at least one non-emergency PDN connection are active upon expiration of the timer, and in response:
locally deactivate the emergency PDN connection; and
send a deactivation indication to the operator network that the emergency PDN connection has been locally deactivated.

14. The device of claim 13, where the system logic circuitry is configured to send the deactivation notification by:
transmission of a periodic tracking area request message to the operator network.

15. The device of claim 14, where the periodic tracking area request message indicates the emergency PDN connection is inactive and that the at least one non-emergency PDN connection is active.

16. The device of claim 13, where the system logic circuitry is configured to send the deactivation indication to the operator network by: establishment of a non-emergency connection with the operator network to send the deactivation indication.

17. The device of claim 13, where the system logic circuitry is configured to send the deactivation indication to allow the operator network to synchronize deactivation of the emergency PDN connection on the operator network.

* * * * *